United States Patent
Iinuma

(12) 
(10) Patent No.: US 6,496,142 B1
(45) Date of Patent: Dec. 17, 2002

(54) ADAPTIVE ARRAY DEVICE

(75) Inventor: Toshinori Iinuma, Gifu (JP)

(73) Assignee: Sanyo Electric Co., Ltd, Osaka (JP)

( * ) Notice: Subject to any disclaimer, the term of this patent is extended or adjusted under 35 U.S.C. 154(b) by 0 days.

(21) Appl. No.: 09/807,439

(22) PCT Filed: Oct. 28, 1999

(86) PCT No.: PCT/JP99/05956
§ 371 (c)(1),
(2), (4) Date: Apr. 23, 2001

(87) PCT Pub. No.: WO00/26988
PCT Pub. Date: Nov. 5, 2000

(51) Int. Cl.$^7$ ................................................ H01Q 3/22
(52) U.S. Cl. ....................................... 342/368; 342/374
(58) Field of Search ................... 342/368, 372, 342/374; 455/83, 277.1, 562

(56) References Cited

U.S. PATENT DOCUMENTS

| | | | |
|---|---|---|---|
| 3,922,685 A | * 11/1975 | Opas | 343/854 |
| 5,041,835 A | * 8/1991 | Matsumoto | 342/374 |
| 5,838,674 A | * 11/1998 | Forssen et al. | 370/337 |
| 6,049,307 A | * 4/2000 | Lim | 342/383 |
| 6,151,310 A | * 11/2000 | Dent | 370/330 |

FOREIGN PATENT DOCUMENTS

| | | |
|---|---|---|
| JP | 59011008 A | 1/1984 |
| JP | 01060101 A | 3/1989 |
| JP | 10248086 A | 9/1998 |

* cited by examiner

Primary Examiner—Dao Phan
(74) Attorney, Agent, or Firm—Arent Fox Kintner Plotkin & Kahn, PLLC

(57) ABSTRACT

A first pattern generating unit forms an adaptive array pattern using every antenna in a plurality of antennas. A second and third pattern generating unit respectively form adaptive array patterns for groups of antennas in the plurality of antennas using a different frequency for each group. A control unit switches between pattern formation by the first pattern generating unit and pattern formations by the second and third pattern generating units.

5 Claims, 12 Drawing Sheets

ADAPTIVE ARRAY DEVICE

This Application is a national stage application of International Application No. PCT/JP99/05956, filed Oct. 28, 1999.

TECHNICAL FIELD

The present invention relates to an adaptive array apparatus that adaptively generates directivity patterns for a plurality of antennas.

BACKGROUND ART

To raise transfer efficiency, digital communication devices that transfer information by modulating a carrier wave using a digital information signal (baseband signal) have been developed in recent years.

In digital communication, frequencies can be used more efficiently by raising the transfer speed or by using time division multiplexing to convert single frequencies into multichannels for use by several users. Raising the transfer speed, however, leads to deterioration in quality due to fading.

A number of techniques to counteract this problem have been developed. A representative technique is the adaptive array method. This method adaptively generates directivity patterns (also referred to as "adaptive array patterns") using a plurality of antennas and generates an electromagnetic wave so that they only reach a user in a specified direction. First, consider an adaptive array apparatus that has four radio units that each include a transmission circuit, a reception circuit, and an antenna. Separate directivity patterns for transmission and reception can be generated for each radio unit by adjusting the gain value of each transmission circuit and the phase of each transmission signal during transmission and by adjusting the gain value of each reception circuit and the phase of each reception signal during reception. The adaptive array method is described in detail in *Adaptive Signal Processing for Spatial Regions and Its Technical Applications* (in "Transactions of the Institute of Electronics, Information, and Communication Engineers (IEICE) of Japan") Vol. J75-B-II No. 11, November 1992.

To perform bidirectional communication using the adaptive array method, it is desirable to have directivity patterns formed by both devices in communication. When this is applied to mobile communication, however, the physical limitations on the size of the mobile devices and the number of antennas used by them make it effectively impossible for mobile devices to form directivity patterns. Accordingly, the base station forms separate directivity patterns for both transmission and reception. This means that during transmission, the base station forms a directivity pattern that is the same as the ideal directivity pattern that was formed during reception and uses it when transmitting signals. In this way, the base station forms different directivity patterns for a plurality of mobile devices and so can multiplex a number of simultaneous connections on a single frequency. This type of communication is called Path Division Multiple Access, or "PDMA" for short. PDMA is described in *Path Division Multiple Access* (PDMA) Mobile Radio Communications Systems (Suzuki, H., and K. Hirade) which was published on pages 37–44 of Technical Report of IEICE, RCS-93-84 January 1994, so that no further explanation will be given here.

Conventional adaptive array apparatuses have a problem in that while it is possible to use one wave (frequency) efficiently by forming different directivity patterns, it has not been possible to do this for a plurality of waves (frequencies). As one example, while base stations used in a mobile telephone system are only assigned a limited number of frequencies in advance, there has been no technology for making efficient use of such communication resources.

DISCLOSURE OF THE INVENTION

In view of the stated problems, it is a primary object of the present invention to provide an adaptive array apparatus that can efficiently use a plurality of frequencies and can efficiently accommodate a large number of mobile devices.

The stated primary object can be achieved by an adaptive array apparatus that has a plurality of antennas, including: a first forming unit for forming an adaptive array pattern using every antenna in the plurality of antennas; a second forming unit for dividing the plurality of antennas into a plurality of groups that each include at least two antennas and forming separate adaptive array patterns for each group of antennas using a different frequency for each group; and a control unit for selectively switching between pattern formation by the first forming unit and pattern formation by the second forming unit.

The present adaptive array apparatus switches between a first operation mode where path multiplexing is performed with an array antenna formed of all the antennas and a second operation mode where path multiplexing is performed with array antennas formed of the antennas split into groups. By switching as required between the operation modes, the adaptive array apparatus can switch between using one frequency or a plurality of frequencies. This results in the adaptive array apparatus efficiently using frequencies and enables the adaptive array apparatus to efficiently accommodate a large number of mobile devices.

Here, the adaptive array apparatus may be used as a base station for mobile telephones that use a time division multiple access (TDMA) method, and the control unit may switch between pattern formation by the first forming unit and pattern formation by the second forming unit according to the number of telephones to be connected.

Also, the second forming unit may not form an adaptive array pattern for one of the groups of antennas during a time slot that is used as a control channel and may form adaptive array patterns for other time slots.

In addition to the effects described above, the present adaptive array apparatus can be used as a radio base station. Since there will be a control channel that is not suited to path multiplexing, a larger number of communication channels can be obtained by using the second operation mode (group mode) instead of the first operation mode (all-antenna mode).

Here, the number of antennas may be m*n (where m and n are integers that are no less than two), and the second forming unit may divide the plurality of antennas into n groups of m antennas.

With the stated construction, each group includes an equal number of antennas, so that by setting the number of signals that are subjected to path multiplexing at an equal value for each group, the formation of adaptive array patterns can be simplified.

The adaptive array apparatus may further include a digital signal processor, the first forming unit may have the digital signal processor calculate gain values and phase amounts of transmission and reception signals of each antenna in the plurality of antennas and use the calculated gain values and phase amounts to form an adaptive array pattern, while the second forming unit may have the digital signal processor calculate gain values and phase amounts of transmission and reception signals of antennas separately for each group and use the calculated gain values and phase amounts to form separate adaptive array patterns for each group.

The present adaptive array apparatus forms adaptive array patterns by executing programs using a digital signal processor. This facilitates the setting of the number of groups, the number of antennas, and the number of antennas in each group at desired values and the dynamic adjustment of such values.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 4 shows an example arrangement for the antennas 10a–80a;

BEST MODE FOR CARRYING OUT THE INVENTION

First Embodiment

The adaptive array apparatus of the first embodiment of the present invention is provided as a PHS (Personal Handyphone System) base station that connects PHS mobile telephones using TDMA/TDD (Time Division Multiple Access/Time Division Duplexing) according to the PHS standard. This adaptive array apparatus performs path division multiple access (PDMA) in addition to time division multiple access (TDMA). Hereafter, signals subjected to PDMA are said to be "path multiplexed".

Overall Construction

Figure 1:
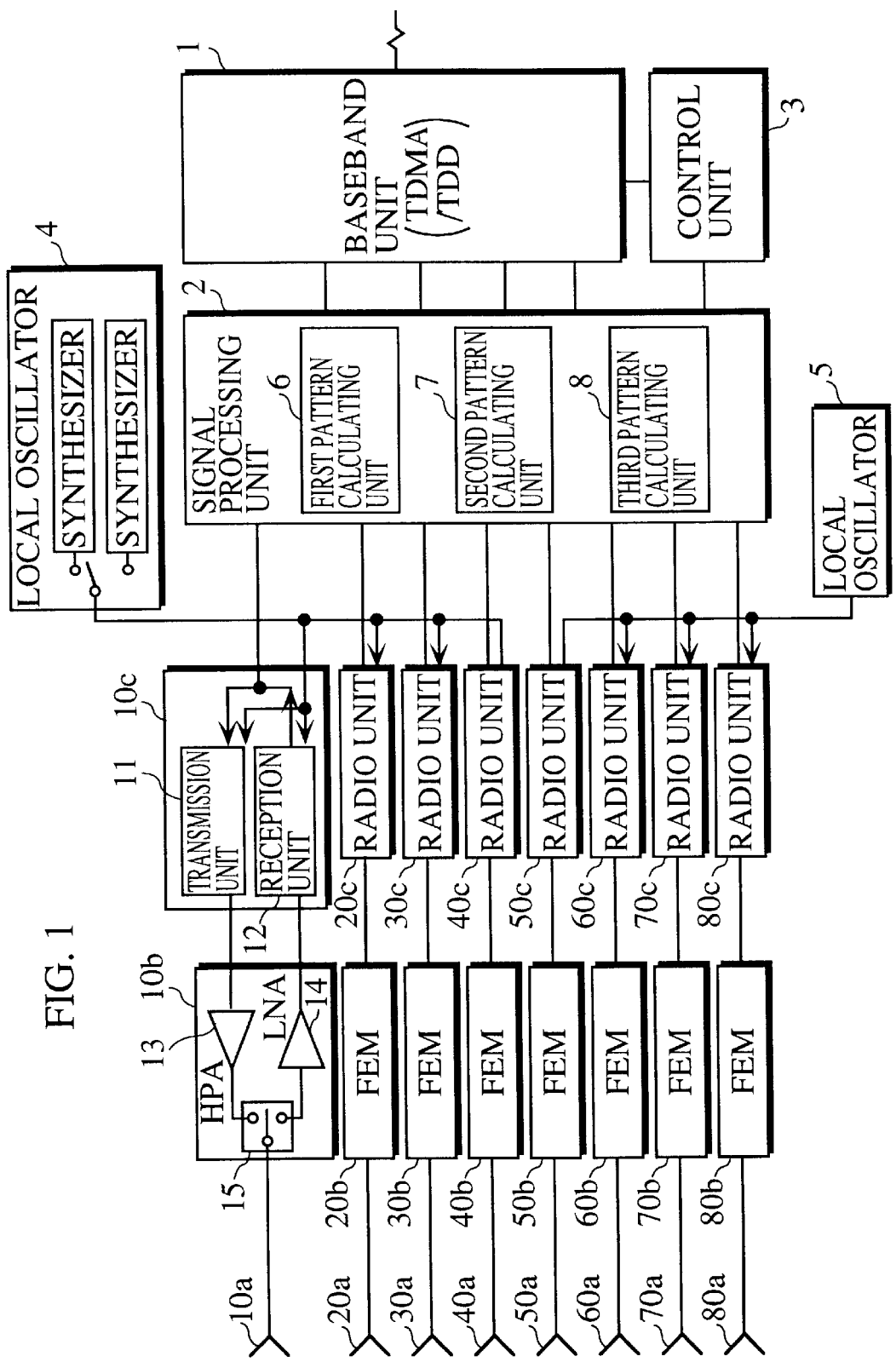
FIG. 1 is a block diagram showing the construction of an adaptive array apparatus that is a first embodiment of the present invention.

FIG. 1 is a block diagram showing an adaptive array apparatus that is a first embodiment of the present invention.

This adaptive array apparatus includes the baseband unit 1, the signal processing unit 2, the control unit 3, the local oscillators 4 and 5, the antennas 10a–80a, the front end modules (hereinafter, "FEMs") 10b–80b, and radio units 10c–80c. The adaptive array apparatus is capable of switching between a mode where directivity patterns for path multiplexing are generated using all of the antennas 10a–80a and a mode where the antennas 10a–80a are divided into a first group A composed of the antennas 10a–40a and a second group B composed of the antennas 50a–80a and directivity patterns for path multiplexing are generated for the antennas in each group using a different frequency for each group. Hereafter, communication where directivity patterns for path multiplexing are generated by all of the antennas 10a–80a will be called "all-antenna mode", while communication where directivity patterns for path multiplexing are generated using the four antennas in each group using different frequencies for group A and group B will be called "group mode". The directivity pattern mentioned above are also referred to as "adaptive array patterns".

Figure 2:
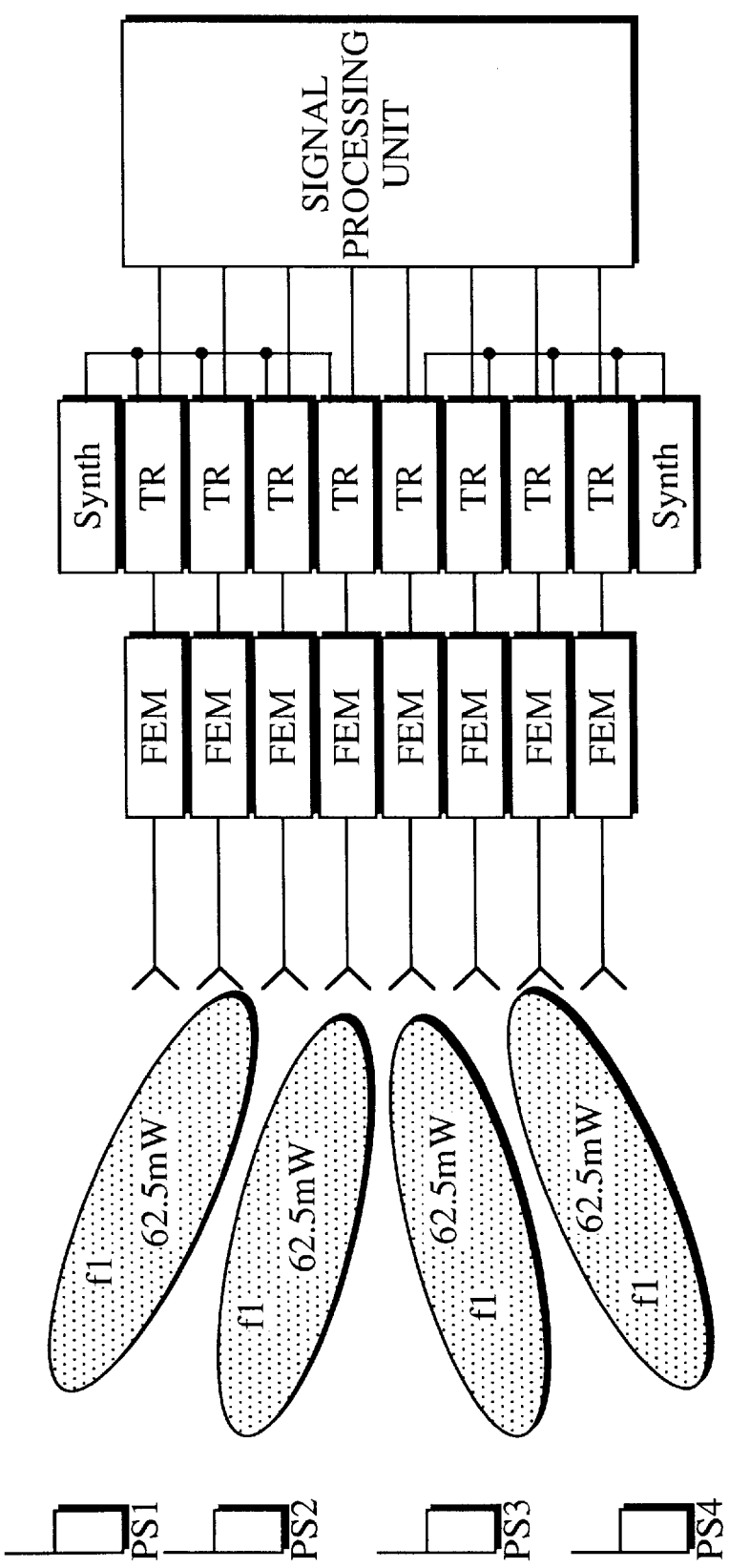
FIG. 2 shows the operation in "all-antenna" mode.

FIG. 2 shows the operation in all-antenna mode. In FIG. 2, path multiplexing is performed in all-antenna mode using the same frequency f1 for the four mobile telephones PS1–PS4.

Figure 3:
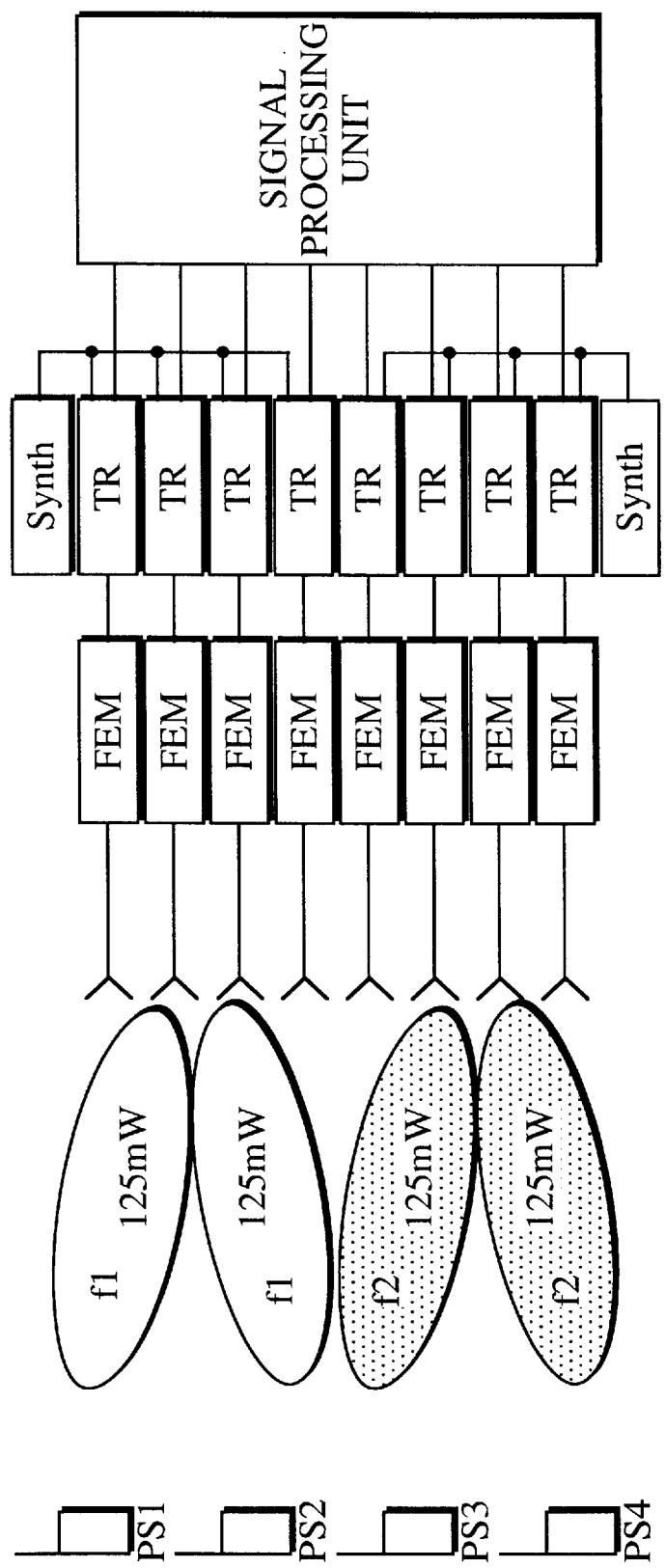
FIG. 3 shows the operation in "group" mode.

FIG. 3 shows the operation in group mode. In FIG. 3, path multiplexing is performed for the two mobile telephones PS1 and PS2 using the frequency f1 and the antennas of group A, while path multiplexing is simultaneously performed for the two mobile telephones PS3 and PS4 using the frequency f2 and group B. Note that FIGS. 2 and 3 show path multiplexing for one time slot produced by division according to a time-division multiplexing method.

In FIG. 1, the baseband unit 1 transmits and receives a plurality of communication signals (baseband signals representing audio or data) between the signal processing unit 2 and a plurality of communication lines connected to the baseband unit 1 via a public telephone network. In the present embodiment, four channels are multiplexed in each TDMA/TDD frame using time division multiplexing and a maximum of four information signals are multiplexed into each channel in a TDMA/TDD frame according to path multiplexing. In this example, each TDMA/TDD frame has a period of 5 ms and is divided into eight equal parts that form four rising time slots (for communication from a PHS telephone to the base station) and four falling time slots (for communication from the base station to a PHS telephone).

In all-antenna mode, the signal processing unit 2 calculates various parameters for forming a directivity pattern for each signal subject to path multiplexing by treating the eight antennas 10a–80a as a single array antenna. This calculation is performed by the first pattern calculating unit 6. In group mode, the signal processing unit 2 treats the groups A and B as separate array antennas and calculates various parameters for forming separate directivity patterns for each signal subject to path multiplexing for each group. This calculation is performed by the second pattern calculating unit 7 and the third pattern calculating unit B. The various parameters referred to here include a gain value and phase amount provided to each of the plurality of antennas that perform transmission or reception for the signals subjected to path multiplexing. A directivity pattern for one signal is formed when simultaneously transmitting or receiving the signal using a plurality of antennas by adjusting the gain values and the phase amounts for the signal separately for each antenna. The gain value can be adjusted, for example, by adjusting the amplification of the transmission unit or reception unit corresponding to an antenna or by adjusting the amplitude of the transmission signal or reception signal separately for each antenna. Adjustment of the gain results changes to the amplitude of the transmission signal for each antenna. The phase amount of a signal can be adjusted by shifting the phase of the signal separately for each antenna. Path multiplexing, meanwhile, is achieved by forming different directivity patterns for a plurality of transmission and signals.

The control unit 3 switches between all-antenna mode and group mode according to factors such as the amount of traffic (i.e., the number of PHS telephones to be connected) for the baseband unit 1.

The local oscillator 4 generates a local frequency signal for the four radio units 10c–40c, while the local oscillator 5 generates a local frequency signal for the four radio units 50c–80c. These local oscillators 4,5 are controlled by the control unit 3 to generate local frequency signals with same frequency in all-antenna mode and to generate local frequency signals with different frequencies in group mode. The local oscillators 4,5 include two internal synthesizers and generate a different local frequency signal for each time slot by switching between the two frequency synthesizers every time slot.

The circuitry composed of the antenna 10a, the FEM 10b (which itself includes a high-power amplifier 13, a low-noise amplifier 14, and an antenna switch 15), and the radio unit 10c (which itself includes the transmission unit 11 and the reception unit 12) uses the local frequency signal outputted by the local oscillator 4 to transmit and receive a plurality of signals that are subjected to path multiplexing. This is also true for the circuitry composed of components 20a, 20b, 20c, the circuitry composed of components 30a, 30b, 30c, and the circuitry composed of components 40a, 40b, 40c.

The circuitry composed of the antenna 50a, the FEM 50b, and the radio unit 50c uses the local frequency signal outputted by the local oscillator 5 to transmit and receive a plurality of signals that are subject to path multiplexing. This is also true for the circuitry composed of components 60a, 60b, 60c, the circuitry composed of components 70a, 70b, 70c, and the circuitry composed of components 80a, 80b, 80c.

Figure 4:
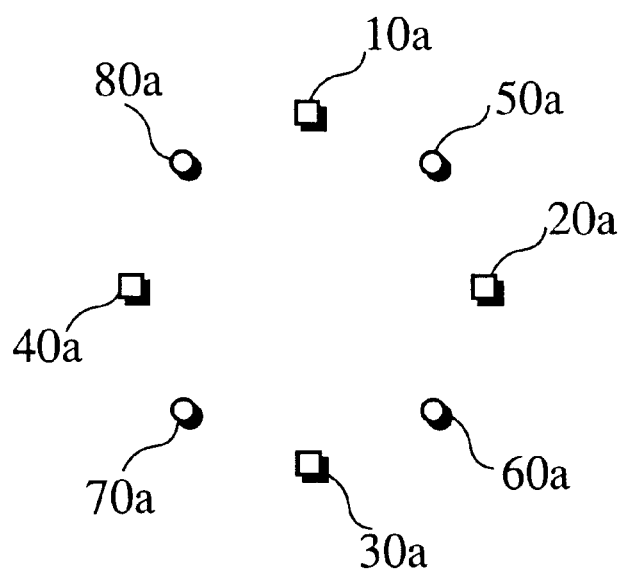

Arrangement of the Antennas FIG. 4 shows an example arrangement of the antennas 10a–80a. In FIG. 4, the arrangement of the eight vertical antennas is shown from above, with the antennas being placed equidistantly around the circumference of a circle. In this example, the four antennas in each group in group mode are arranged as the vertices of a square.

Even when the above circular arrangement is not used, it is still preferable for the antennas to be placed in an arrangement that facilitates the generation of directivity patterns in a plurality of directions, such as when the antennas of the two groups are arranged in a two-by-four checkerboard pattern. The number of antennas is also not limited to eight, since a greater number facilitates the generation of directivity patterns.

Baseband Unit 1

Figure 5:
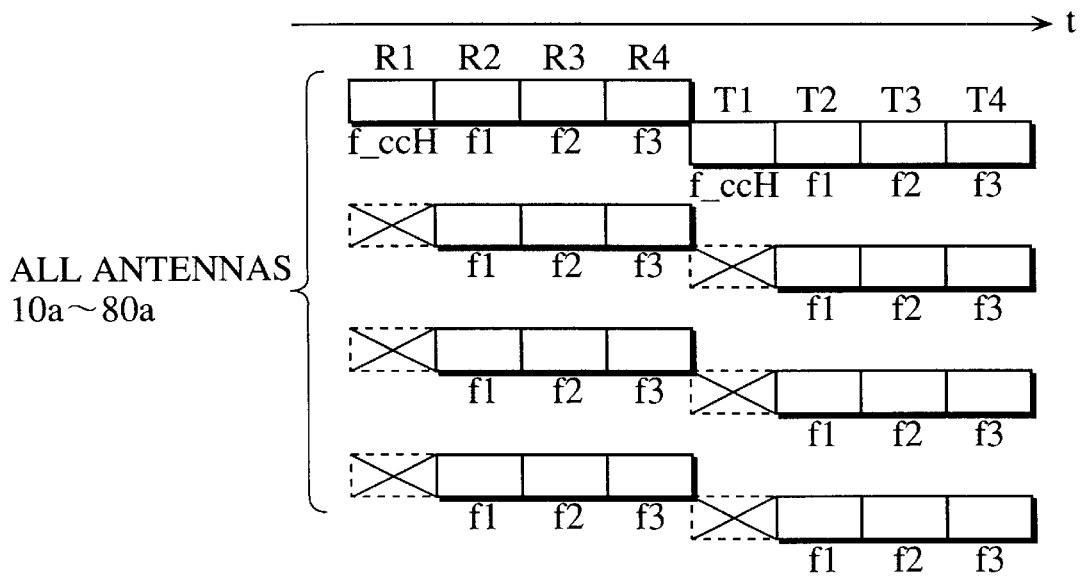
FIG. 5 shows the TDMA/TDD processing and path multiplexing processing of the baseband unit during the all-antenna mode.

FIG. 5 shows the TDMA/TDD processing and path multiplexing processing of the baseband unit 1 during the all-antenna mode.

In FIG. 5, the horizontal axis represents time and shows TDMA/TDD frames for one period (5 ms). The symbols R1–R4 shows the reception time slots, while the symbols T1–T4 shows the transmission time slots. The legends "f_ccH", "f1", "f2", and "f3" are not directly related to the baseband unit 1, but show the carrier frequency used by the eight antennas for transmission and reception. Of these, "f_ccH" is the transmission/reception frequency of the control channel, which is fixed according to PHS standard, while "f1", "f2", and "f3" are the communication frequencies, which under PHS standard are set so that frequency with an unused channel, out of a plurality of frequency, can be used as desired. While the operation states of nearby base stations lead to the possibility of the frequencies f1, f2, and f3 being equal, there is also the possibility of the frequencies changing for every time slot.

The vertical axis in FIG. 5 shows the number of signals to be path multiplexed on the same frequency using all of the antennas. In the illustrated example, this number is four, so that signals for four PHS telephones are subjected to path multiplexing by forming four directivity patterns for each time slot.

The time slots R1 and T1 on the control channel that have been crossed out in FIG. 5 show that this frequency is dedicated to use as the control channel, so that communication channels cannot be multiplexed into these time slots.

As shown in FIG. 5, during all-antenna mode all time slots except for those dedicated to the control channel can be used as communication channels for communication with PHS telephones. This means that the present adaptive array apparatus can perform simultaneous communication with a maximum of twelve PHS telephones.

Figure 6:
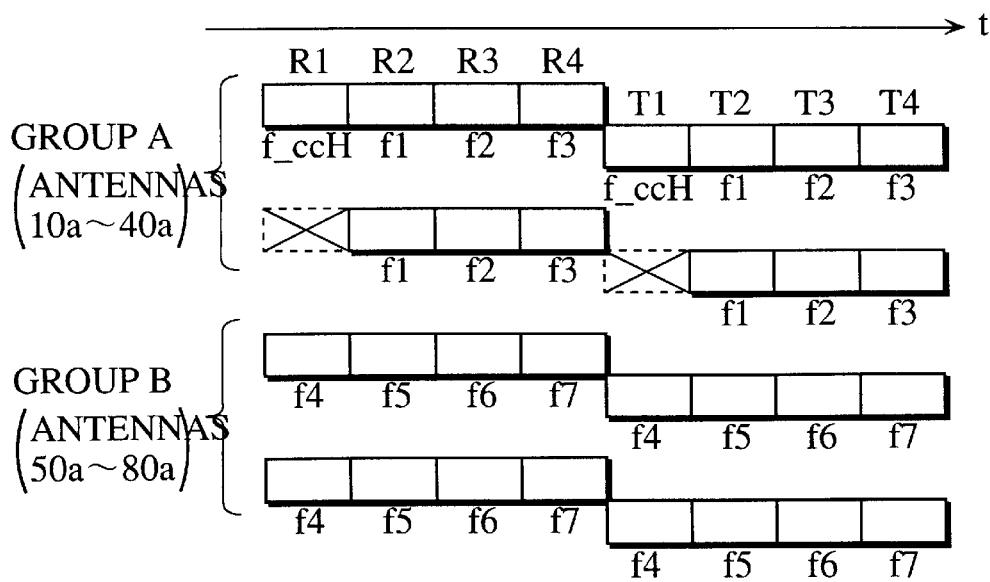
FIG. 6 shows the TDMA/TDD processing and path multiplexing processing of the baseband unit during the group mode.

FIG. 6 shows the TDMA/TDD processing and path multiplexing processing of the baseband unit 1 during the group mode.

As in FIG. 5, the horizontal axis in FIG. 6 represents time, while the vertical axis represents the number of signals that can be subjected to path multiplexing. The upper two levels in FIG. 6 show that one general-use frequency is available for multiplexing two signals the antennas of group A. In the same way, the lower two levels show that another general-use frequency is available for multiplexing two signals using the antennas of group B.

As shown in FIG. 6, time slots dedicated to the control channel are provided in group A, so that all of the time slots of group B can be used for path multiplexing by communication channels. This means that the present adaptive array apparatus can perform simultaneous communication with a maximum of fourteen PHS telephones.

Signal Processing Unit 2

Figure 7:
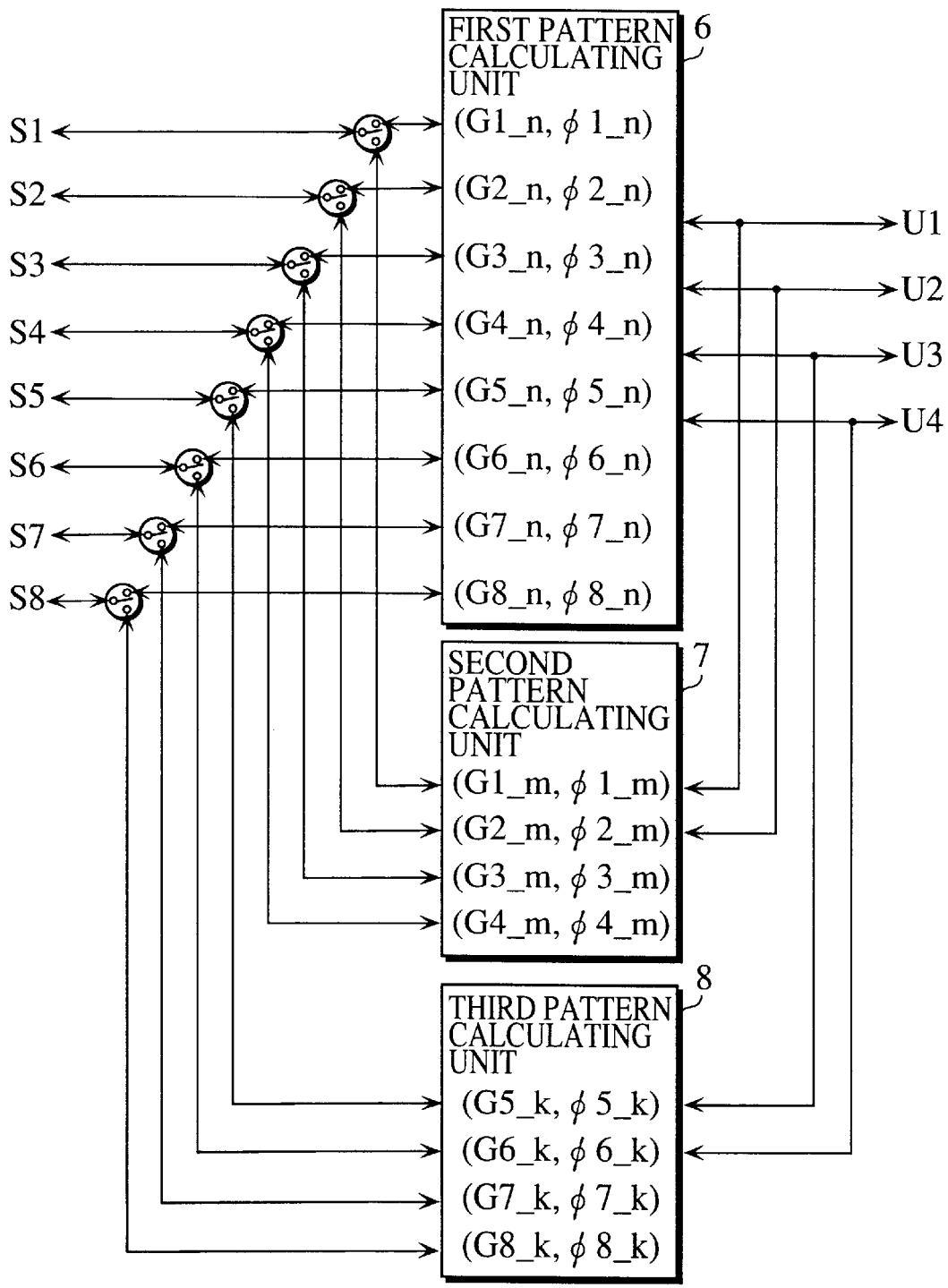
FIG. 7 is a block diagram showing the detailed construction of the signal processing unit 2.

FIG. 7 is a block diagram showing the detailed construction of the signal processing unit 2.

The signal processing unit 2 includes a first pattern calculating unit 6 that calculates various parameters in all-antenna mode, second and third pattern calculating units 7, 8 that calculate various parameters in group mode, and a switch group for switching between modes. The switches that compose the switch group are shown by the eight circles in FIG. 7.

In more detail, the signal processing unit 2 is composed of a DSP (Digital Signal Processor) and the first-third pattern calculating units 6–8 and switch group are realized by having the DSP execute programs in which functions of these components are defined.

The first pattern calculating unit 6 shown in FIG. 7 path multiplexes a maximum of four signals in the same way as the examples in FIGS. 2 and 5, while the second and third pattern calculating units 7 and 8 multiplex a maximum of two signals each in the same way as the examples in FIGS. 3 and 6. Lines S1–S8 in FIG. 7 show the transmission/reception signals of the eight antennas, while lines U1–U4 show the baseband signals on four communication lines that should be path multiplexed in each time slot within a TDMA/TDD frame.

During each time slot, the first pattern calculating unit 6 calculates eight gain values G1_n~G8_n and eight phase amounts φ1_n~φ8_n for the eight antennas so that the baseband signals U1~U4 can be dispersed and transmitted and received via the eight antennas. Here, the value n indicates that there are as many parameters as there are signals subjected to the path multiplexing, so that there are four parameters (n=1–4) corresponding to the baseband signals U1–U4.

Figure 8:
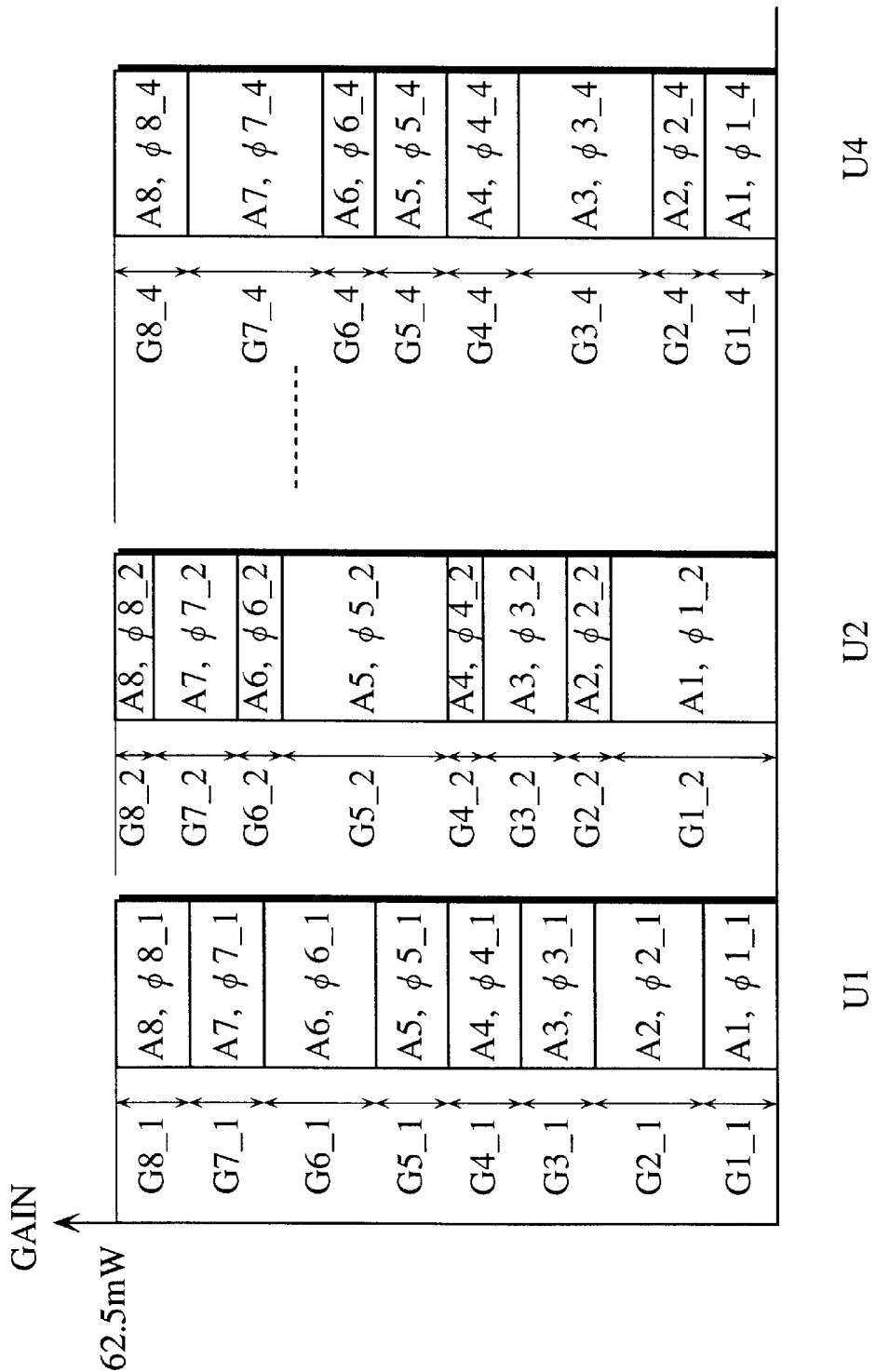
FIG. 8 shows the interrelationships between parameters calculated by the first pattern calculating unit 6.

FIG. 8 shows the interrelationships between parameters calculated by the first pattern calculating unit 6.

In FIG. 8, different values of the gain are given in the vertical axis, while the different users are arranged in the horizontal axis. The values A1~A8 represent the antennas 10*a*~80*a*. As one example, the user U1 performs transmission and reception via antenna 10*a* using the gain G1_1 and the phase amount φ1_1 and transmission and reception via antenna 20*a* using the gain G2_1 and the phase amount φ2_1. The same also goes for antennas 30*a*–80*a*. In this way, gain values and phase amounts are separately provided for each of the eight antennas. The total transmission output of the eight antennas is 250 mW and the transmission output of the eight antennas per user is 62.5 mW.

In the case of the antenna 10*a*, the four baseband signals U1–U4 are transmitted and received having been mixed using the appropriate gain values and phase amounts for this antenna and the four baseband signals. During reception, the first pattern calculating unit 6 calculates a suitable gain value and phase amount for separating the baseband signals U1–U4 from the signals S1–S8. During transmission, the first pattern calculating unit 6 generates the signals S1–S8 from the baseband signals U1–U4 using the gain values and phase amounts calculated during reception.

Note that while FIG. 8 shows the case where path multiplexing is performed for four signals, the first pattern calculating unit 6 calculates parameters for one or a plurality of directivity patterns in accordance with the actual number of channels that are connected. In the present embodiment, this number of channels has a maximum value of four.

The second and third pattern calculating units 7 and 8 only differ from the first pattern calculating unit 6 in the number of signals used for path multiplexing and the number of antennas handled. Accordingly, no explanation of such will be given.

Figure 9:
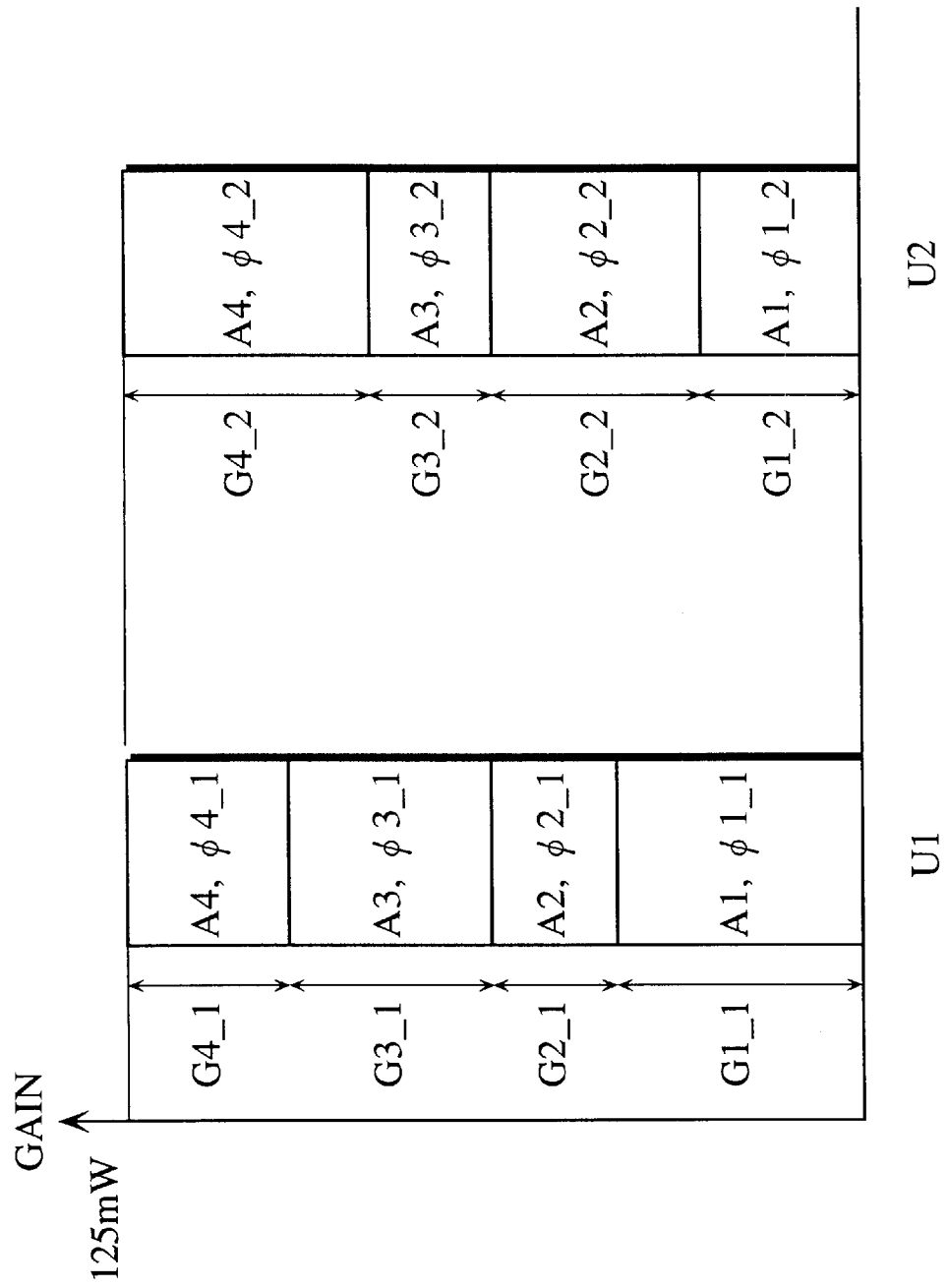
FIG. 9 shows the interrelationships between parameters calculated by the second pattern calculating unit 7.
Figure 10:
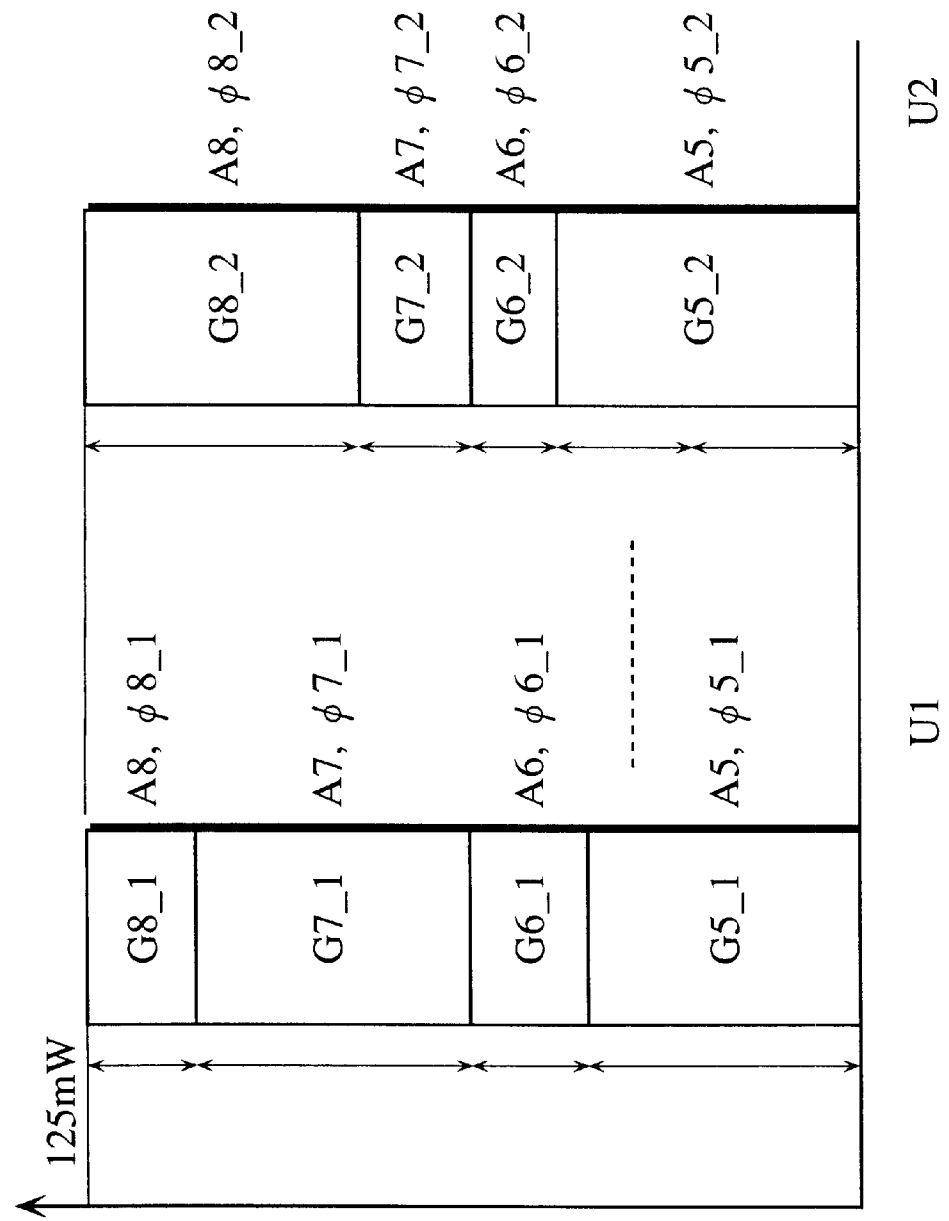
FIG. 10 shows the interrelationships between parameters calculated by the third pattern calculating unit 8.

FIGS. 9 and 10 respectively show the interrelationships between parameters calculated by the second pattern calculating unit 7 and between parameters calculated by the third pattern calculating unit 8. These drawings are fundamentally the same as FIG. 8. The second and third pattern calculating units 7 and 8 calculate parameters for one or a plurality of directivity patterns in accordance with the actual number of channels that are connected. In the present embodiment, this number of channels has a maximum value of two.

Control Unit 3

Figure 11:
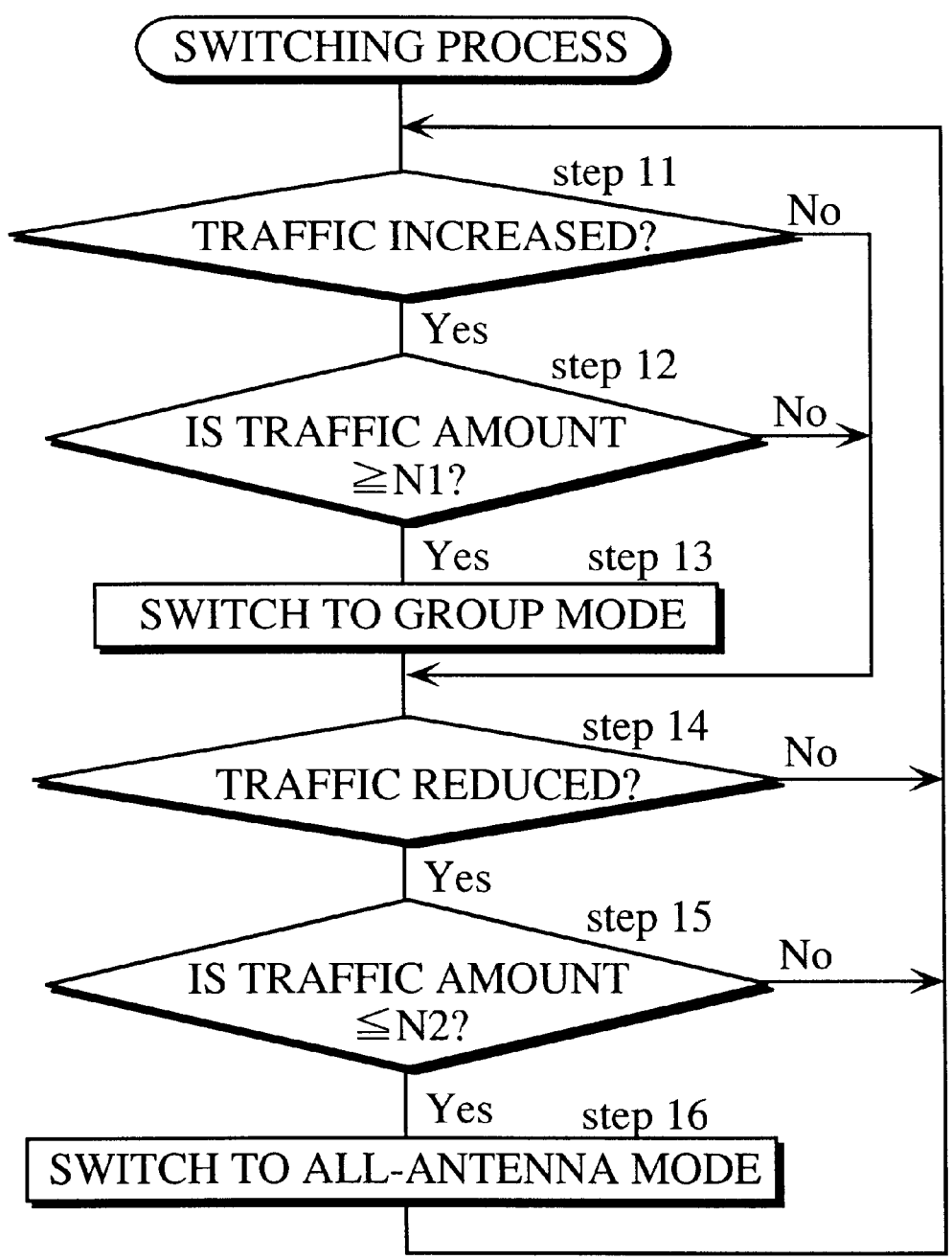
FIG. 11 is a flowchart showing the processing performed by the control unit 3 to switch between all-antenna mode and group mode.

FIG. 11 is a flowchart showing the processing performed by the control unit 3 to switch between all-antenna mode and group mode.

The control unit 3 monitors the amount of traffic (number of connected lines) for the baseband unit 1. When there is an increase in traffic and the amount of traffic is at least equal to N1 (for example, twelve) ("yes" in steps 11 and 12), the control unit 3 switches from all-antenna mode to group mode (step 13). Conversely, when there is a decrease in traffic and the amount of traffic falls to N2 (for example, eleven) or less ("yes" in steps 14 and 15), the control unit 3 switches from group mode to all-antenna mode (step 16).

In this switching process, the reason N1 is set at twelve and N2 at eleven is that the maximum number of mobile telephones that can be handled by the adaptive array apparatus of the present embodiment is twelve for all-antenna mode and fourteen for group mode. When the number of connected mobile telephones rises from eleven to twelve, the control unit 3 will switch from all-antenna mode to group mode and when the number falls from twelve to eleven, the control unit 3 will switch from group mode to all-antenna mode. In this way, the values N1 and N2 should be set at suitable values for the maximum number of telephones for group mode and all-antenna mode.

As described above, the adaptive array apparatus of the present embodiment can switch between all-antenna mode and group mode. When the adaptive array apparatus is used as a radio base station as described in the present embodiment, a control channel that is not suited to path multiplexing with communication channels is present, so that the group mode can be used to secure a larger number of communication channels that the all-antenna mode.

Note that the transmission output of the radio base station for one frequency has a maximum level that is fixed according to certain standards, so that the effective transmission output per mobile telephone will differ in accordance with the number of signals subjected to path multiplexing. As examples, if it is assumed that the total transmission output of the eight antennas in FIG. 2 is 250 mW, path multiplexing of four signals gives an effective transmission output of 62.5 mW per mobile telephone. If it is assumed that the total transmission output of the eight antennas in FIG. 3 is 250 mW, path multiplexing of two signals gives an effective transmission output of 125 mW per mobile telephone.

Since the effective transmission output per mobile telephone differs in as described above in all-antenna and group modes, switching between the modes can be performed according to the factors dependent on the positioning of mobile telephones and way in which such telephones are connected.

The present embodiment describes the case where there are eight antennas, two groups, and four antennas in each group, though these values can be freely changed. Different groups may also contain different numbers of antennas.

Second Embodiment

Figure 12:
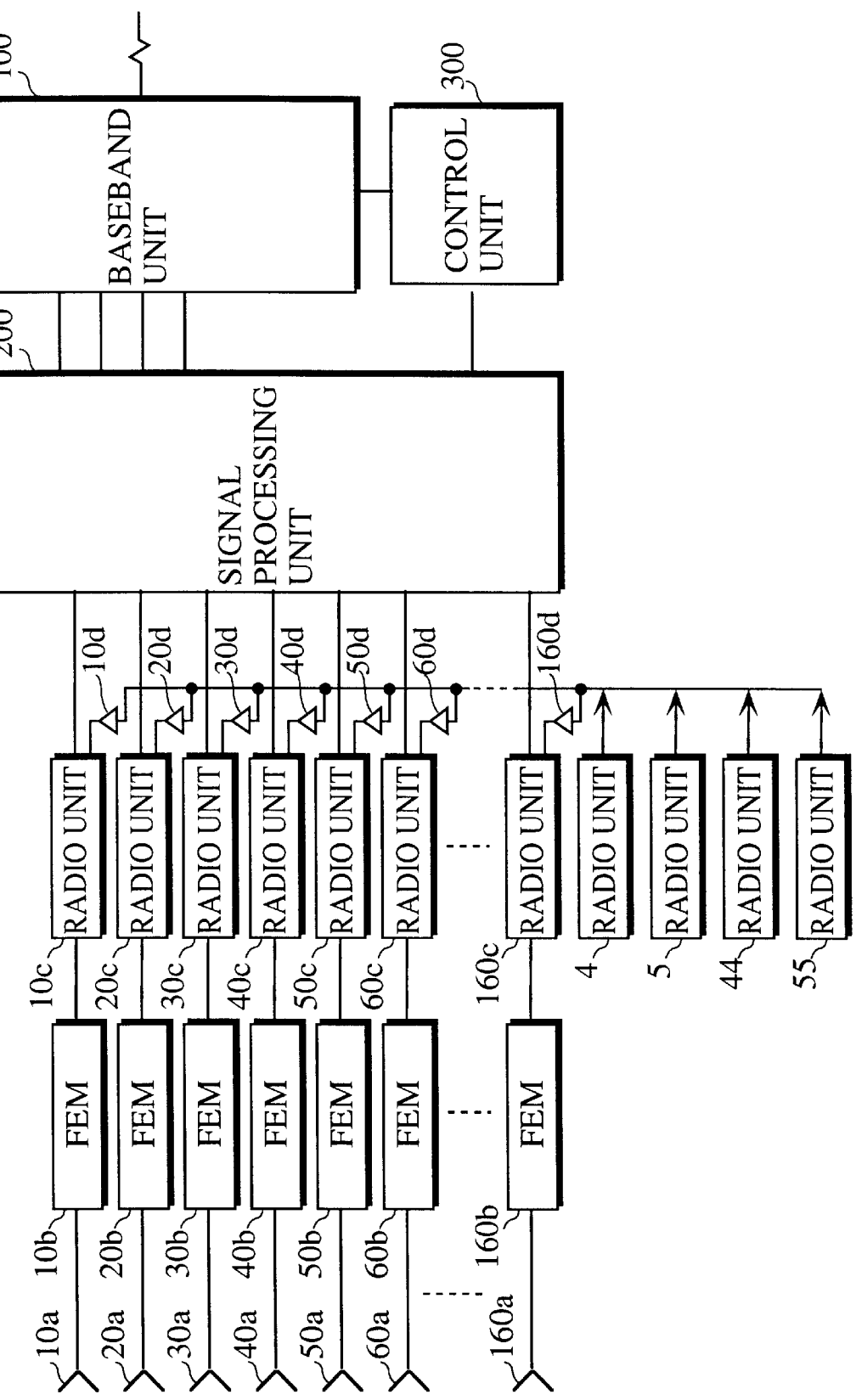
FIG. 12 is a block diagram showing the construction of an adaptive array apparatus that is a second embodiment of the present invention.

FIG. 12 is a block diagram showing the construction of an adaptive array apparatus that is a second embodiment of the present invention.

As shown in FIG. 12, the second embodiment differs from the first embodiment in that antennas 90*a*–160*a*, FEMs 90*b*–160*b*, radio units 90*c*–160*c*, local oscillators 44, 55, and the four input-one output selectors 10*d*–160*d* have been newly added and that the baseband unit 1, the signal processing unit 2, and the control unit 3 have been replaced with the baseband unit 100, the signal processing unit 200, and the control unit 300. This adaptive array apparatus is provided with an increased number of antennas to form a larger number of groups and channels, so that a plurality of communication channels can be assigned to a single mobile telephone. The following description uses the same reference numerals for components with the same functions as those in the first embodiment, and gives no further explanation of such. Instead, the description focuses on the differences with the first embodiment.

The antennas 90*a*–160*a*, the FEMs 90*b*–160*b*, and the radio units 90*c*–160*c* are the same as the antennas 10*a*–80*a*, the FEMs 10*b*–80*b*, and the radio units 10*c*–80*c*.

The local oscillators 44, 55 are the same as the local oscillators 4, 5 shown in FIG. 1.

The selectors 10d–160d each select one of the four frequency signals outputted by the local oscillators 4, 5, 44, 55 and respectively output the selected signal to the radio units 10c–160c.

The baseband unit 100 differs from the baseband unit 1 in that the number of telephones that can be connected via the public telephone network is thirty-three and that the maximum number of signals that can be subjected to path multiplexing in one time slot is eight. The baseband unit 100 is otherwise the same as the baseband unit 1.

The signal processing unit 200 differs from the signal processing unit 2 in that it supports an all-antenna mode where path multiplexing is performed using sixteen antennas and a group mode where four groups A–D each including four antennas perform path multiplexing using different frequencies. In the present embodiment, group A includes antenna 10a–40a, group B includes antenna 50a–80a, group C includes antenna 90a–120a, group D includes antenna 130a–160a.

As a result, the signal processing unit 200 has a fourth pattern calculating unit for calculating gain values and phase amounts for sixteen antennas and fifth–eighth pattern calculating units for calculating gain values and phase amounts for groups four antennas. These pattern calculating units only differ from the first pattern calculating unit 6 in the first embodiment in the number of antennas and number of signals subjected to path multiplexing, and are otherwise the same.

The control unit 300 switches between all-antenna mode and group mode according to the amount of traffic for the baseband unit 100. The control unit 300 also performs control to assign a plurality of channels to each mobile telephone. In more detail, on receiving an indication of a desired number of channels to be assigned together with a call request from a mobile telephone, the control unit 300 assigns the indicated number of communication channels if sufficient unused channels exist.

Figure 13:
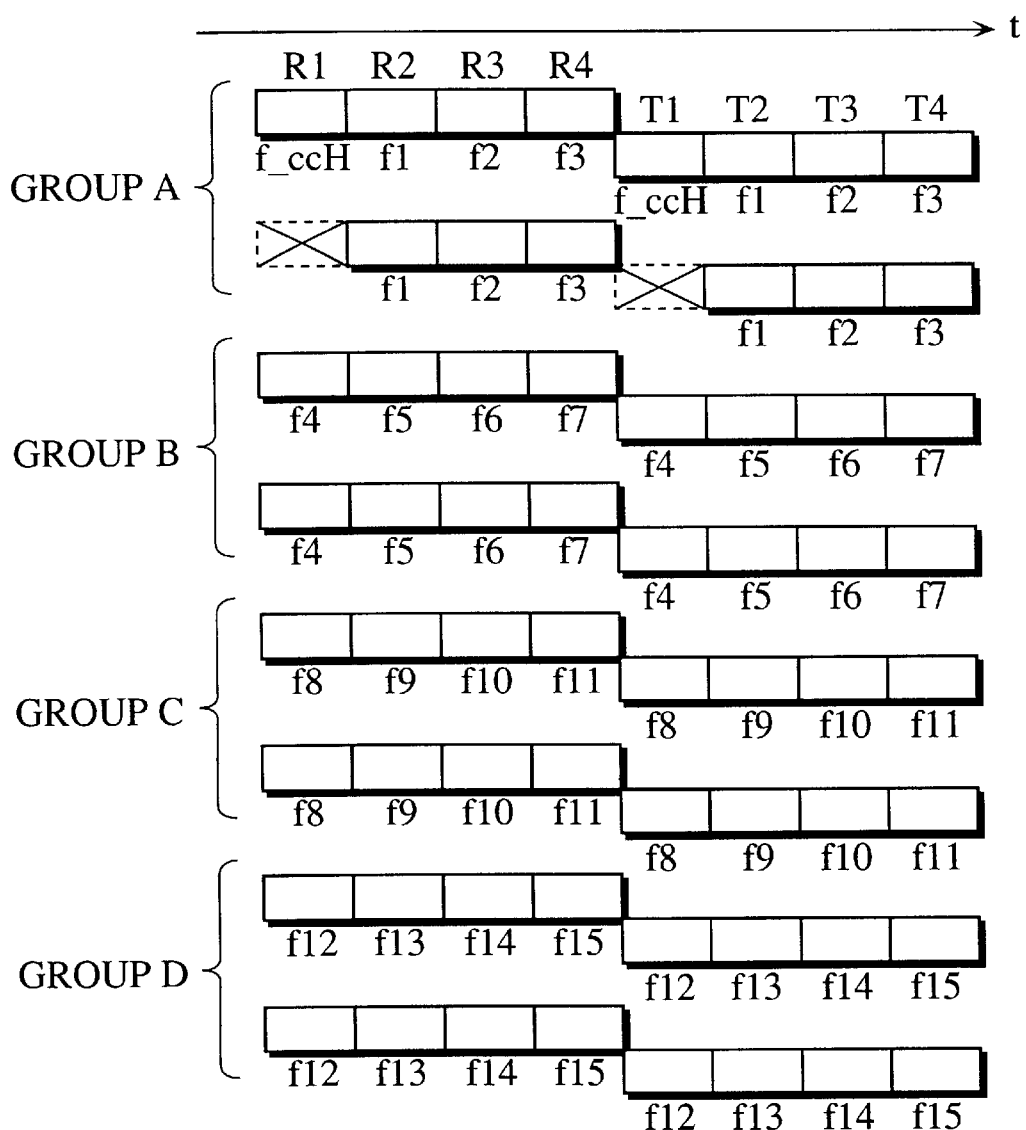
FIG. 13 shows the TDMA/TDD processing and path multiplexing processing of the baseband unit 100 during the group mode.

FIG. 13 shows the TDMA/TDD processing and path multiplexing processing of the baseband unit 100 during the group mode.

FIG. 13 differs from FIG. 6 in that time division multiplexing and path multiplexing are performed using another two groups, groups C and D. As a result, a total of thirty-one communication channels are available.

The following describes the operation of the adaptive array apparatus of the present embodiment whose structure is given above.

The operation for path multiplexing by the present adaptive array apparatus is the same as in the first embodiment and will not be described. Instead, the following description focuses on the assignment of channels by the control unit 300.

In the group mode shown in FIG. 13, the control unit 300 assigns a plurality of channels to one mobile telephone in accordance with the number of channels indicated by the mobile telephone. At any given time, the number of communication channels that can be assigned for groups A, B, C, and D are 3, 4, 4, and 4, respectively. This means a maximum of 15 channels are available.

As one example, when a mobile telephone indicates that it wants to be assigned four channels, the control unit 300 assigns all four channels in one of the groups B, C, and D if all channels in such a group are available. When a mobile telephone indicates that it wants to be assigned five channels, the control unit 300 assigns, for example, three channels of group A and two of group B.

When requesting up to four channels on the same frequency, a mobile telephone, such as a conventional PHS telephone, indicates the number of channels via the control channel when initiating a call, and so may perform transmission and reception using four channels on the same frequency.

When five or more channels are used, a mobile telephone will need to perform transmission and reception on a plurality of different frequencies, so that unlike a present PHS telephone, a mobile telephone should include two radio unit subsystems.

In order to be assigned the maximum of fifteen channels, a mobile telephone should include four radio unit subsystems.

As described above, the adaptive array apparatus of the present embodiment can switch between all-antenna mode and group mode, so that combinations of antennas that compose groups can be flexibly changed.

A plurality of communication channels can be assigned to one mobile telephone, so that high-speed data communication can be achieved. As one example, if a maximum of fifteen channels are assigned, a transfer speed (bandwidth) of 480 kbps (32 kbps*15 channels) can be obtained, which allows high-quality moving pictures to be transferred in real time by radio communication. Since the number of channels can be indicated by a mobile telephone, a suitable transfer speed (bandwidth) can be obtained for the size of the data to be transferred and the extent to which real-time reproduction of the data is required.

In the present embodiment, the number of antennas, the number of groups, and the number of signals subjected to path multiplexing can all be freely selected. The number of signals subjected to path multiplexing can be one or greater than one.

While the present embodiment describes the case where the adaptive array apparatus is used as a PHS base station, the adaptive array apparatus may be used as a base station for other kinds of mobile communication system or as any other kind of radio station.

INDUSTRIAL APPLICABILITY

The adaptive array apparatus of the present invention is capable of switching between the formation of a directivity pattern using all antennas and the formation of separate directivity patterns for the antennas in different antenna groups, and is suited to use in a base station for a mobile communication system.

What is claimed is:

1. An adaptive array apparatus that has a plurality of antennas, comprising:

first forming means for forming an adaptive array pattern using every antenna in the plurality of antennas;

second forming means for dividing the plurality of antennas into a plurality of groups that each include at least two antennas and forming separate adaptive array patterns for each group; and control means for selectively switching between pattern formation by the first forming means and pattern formation by the second forming means.

2. An adaptive array apparatus according to claim 1, the adaptive array apparatus being used as a base station for mobile telephones that use a time division multiple access (TDMA) method, the control means switching between pattern formation by the first forming means and pattern formation by the second forming means according to a number of telephones to be connected.

3. An adaptive array apparatus according to claim 2, wherein for one of the groups of antennas, the second forming means does not form an adaptive array pattern for a time slot that is used as a control channel and forms adaptive array patterns for other time slots.

4. An adaptive array apparatus according to either claim 1 or 2,
wherein the number of antennas is m*n (where m and n are integers that are no less than two),
the second forming means dividing the plurality of antennas into n groups of m antennas.

5. An adaptive array apparatus according to one of claims 1 to 3, further comprising a digital signal processor, wherein the first forming means has the digital signal processor calculate gain values and phase amounts of transmission and reception signals of every antenna in the plurality of antennas, and uses the calculated gain values and phase amounts to form an adaptive array pattern, and
the second forming means has the digital signal processor calculate gain values and phase amounts of transmission and reception signals of antennas separately for each group, and uses the calculated gain values and phase amounts to form separate adaptive array patterns for each group.

* * * * *